United States Patent [19]

Jaeger

[11] Patent Number: 5,279,064
[45] Date of Patent: Jan. 18, 1994

[54] FISH HOOKING APPARATUS

[76] Inventor: Paul R. Jaeger, 156 7th Ave. E., Estell Manor, N.J. 08319

[21] Appl. No.: 27,424

[22] Filed: Mar. 8, 1993

[51] Int. Cl.⁵ .................................................. A01K 97/10
[52] U.S. Cl. ........................................... 43/21.2; 43/15
[58] Field of Search ................................ 43/21.2, 15, 16

[56] References Cited

U.S. PATENT DOCUMENTS

| | | | |
|---|---|---|---|
| 2,821,041 | 1/1958 | Hughes | 43/16 |
| 3,016,648 | 1/1962 | Ingersoll | 43/15 |
| 3,619,931 | 11/1971 | Brummett | 43/15 |
| 3,699,701 | 10/1972 | Jacobs | 43/15 |
| 4,471,553 | 9/1984 | Copeland | 43/15 |
| 4,486,968 | 12/1984 | Gould | 43/21.2 |
| 4,677,784 | 7/1987 | Butkus | 43/16 |
| 4,827,654 | 5/1989 | Roberts | 43/21.2 |

FOREIGN PATENT DOCUMENTS 0267899  5/1989  Fed. Rep. of Germany ....... 43/21.2

Primary Examiner—Paula A. Bradley
Assistant Examiner—James Miner
Attorney, Agent, or Firm—Leon Gilden

[57] ABSTRACT

An apparatus having a support post rotatably mounting a tube member, having a first end in engagement with an abutment flange of the support post, with the rotation of the mounting tube relative to the support post, wherein the mounting tube is pivotally mounted within a bifurcated support, wherein the mounting tube receiving a fishing rod therewithin is engaged to a position plate, whereupon a fish strike is released therefrom and retracted by cooperation of a spring member secured to a spring leg mounted to the mounting tube.

4 Claims, 4 Drawing Sheets

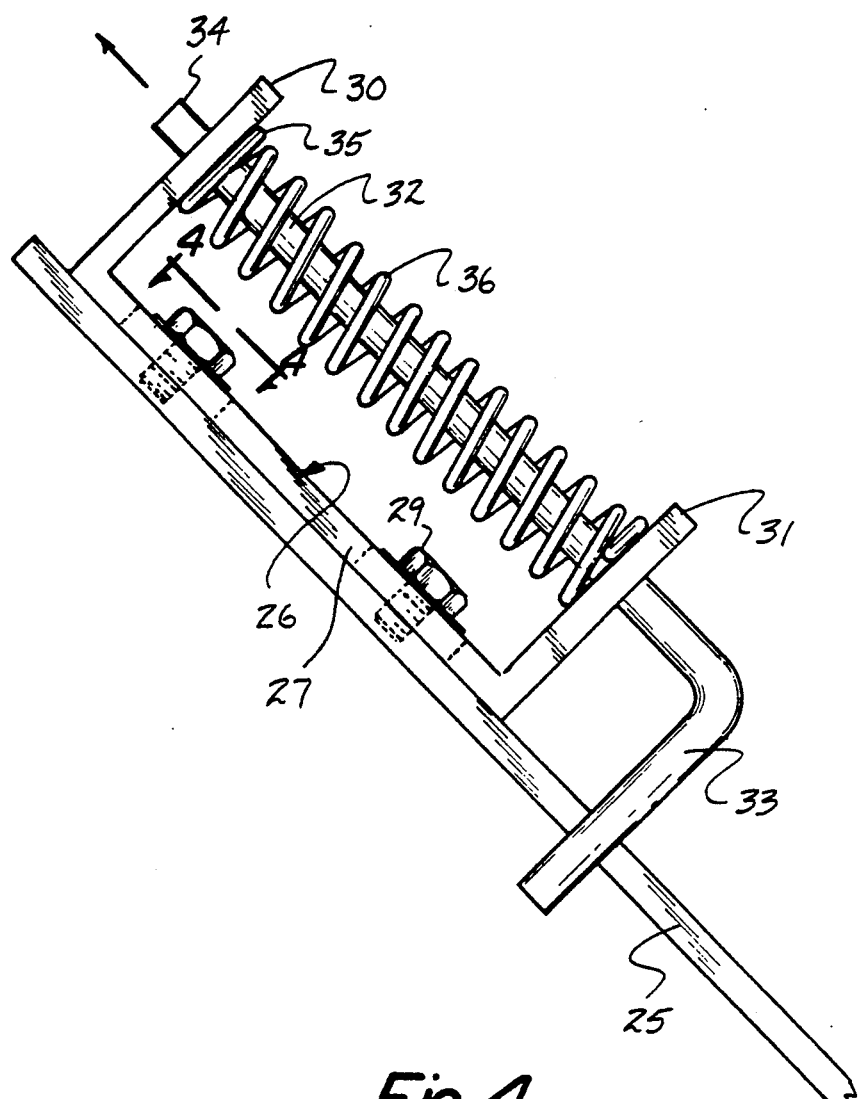
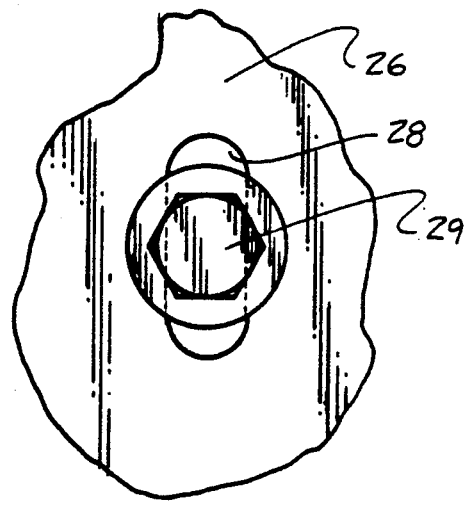

FISH HOOKING APPARATUS

BACKGROUND OF THE INVENTION

1. Field of the Invention

The field of invention relates to fishing apparatus, and more particularly pertains to a new and improved fish hooking apparatus wherein the same is directed to the hooking of a fish by a whip-like action upon a fish strike.

2. Description of the Prior Art

Fish hooking apparatus of various types are indicated in the prior art and exemplified by the U.S. Pat. Nos. 4,651,460; 3,475,847; 5,050,332; 5,063,373; and 3,881,269.

The instant invention attempts to overcome deficiencies of the prior art by providing for a compact organization arranged to engage a hook within a fish upon a fish strike and in this respect, the present invention substantially fulfills this need.

SUMMARY OF THE INVENTION

In view of the foregoing disadvantages inherent in the known types of fish hooking apparatus now present in the prior art, the present invention provides a fish hooking apparatus wherein a mounting tube is spring-biased to a retracted orientation and directed thereto upon a fish strike. As such, the general purpose of the present invention, which will be described subsequently in greater detail, is to provide a new and improved fish hooking apparatus which has all the advantages of the prior art fish hooking apparatus and none of the disadvantages.

To attain this, the present invention provides an apparatus having a support post rotatably mounting a tube member, having a first end in engagement with an abutment flange of the support post, with the rotation of the mounting tube relative to the support post, wherein the mounting tube is pivotally mounted within a bifurcated support, wherein the mounting tube receiving a fishing rod therewithin is engaged to a positioned plate, whereupon a fish strike is released therefrom and retracted by cooperation of a spring member secured to a spring leg mounted to the mounting tube.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fish hooking apparatus which has all the advantages of the prior art fish hooking apparatus and none of the disadvantages.

It is another object of the present invention to provide a new and improved fish hooking apparatus which may be easily and efficiently manufactured and marketed.

It is a further object of the present invention to provide a new and improved fish hooking apparatus which is of a durable and reliable construction.

An even further object of the present invention is to provide a new and improved fish hooking apparatus which is susceptible of a low cost of manufacture with regard to both materials and labor, and which accordingly is then susceptible of low prices of sale to the consuming public, thereby making such fish hooking apparatus economically available to the buying public.

Still yet another object of the present invention is to provide a new and improved fish hooking apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged orthographic view of section 3 as set forth in FIG. 1.

FIG. 4 is an orthographic view, taken along the lines 4—4 of FIG. 3 in the direction indicated by the arrows.

DESCRIPTION OF THE PREFERRED EMBODIMENT

Figure 1:
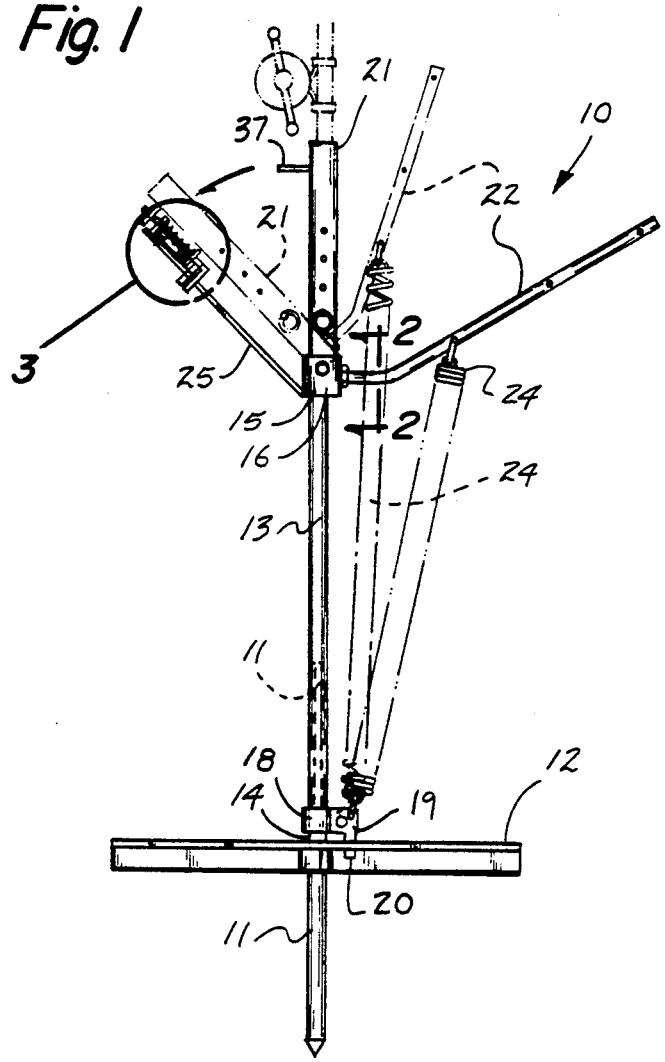
FIG. 1 is an orthographic view of the invention.
Figure 2:
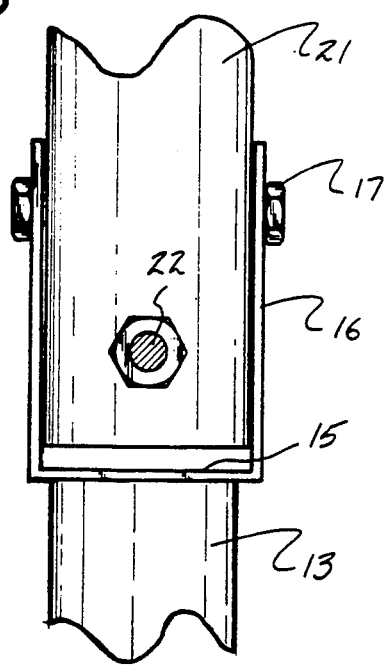
FIG. 2 is an enlarged orthographic view, taken along the lines 2—2 of FIG. 1 in the direction indicated by the arrows.
Figure 5:
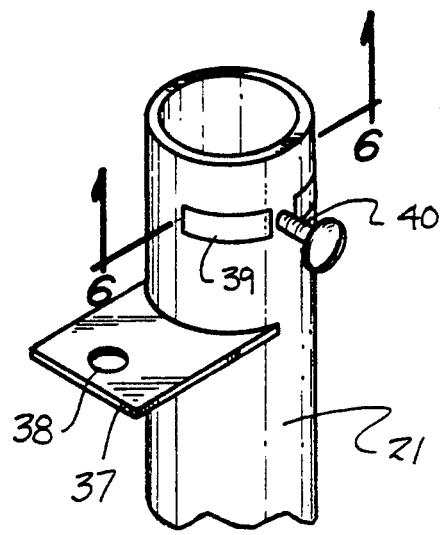
FIG. 5 is an enlarged isometric illustration of the free distal end of the mounting tube structure.
Figure 6:
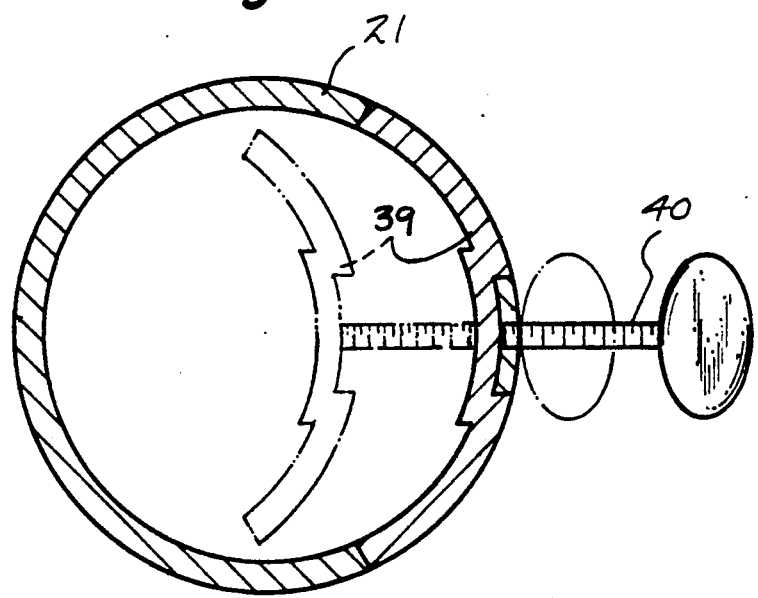
FIG. 6 is an orthographic view, taken along the lines 6—6 of FIG. 5 in the direction indicated by the arrows.

With reference now to the drawings, and in particular to FIGS. 1 to 8 thereof, a new and improved fish hooking apparatus embodying the principles and concepts of the present invention and generally designated by the reference numeral 10 will be described.

More specifically, the fish hooking apparatus 10 of the instant invention essentially comprises a support post 11 mounting an abutment flange 12 intermediate the support post uppermost and lowermost ends, with the abutment flange orthogonally oriented relative to the support post. A mounting tube 13 is rotatably mounted onto the support post 11 and includes a tube first end 14 spaced from a tube second end 15. A tube bifurcated support 16 is mounted to the tube second end 15, having a support axle 17 directed orthogonally through the bifurcated support to rotatably mount a lowermost end portion of a fishing rod tube 21. An anchor collar 18 is secured fixedly to the mounting tube 13 adjacent the first end 14, having a collar flange 19 that in turn includes an abutment leg 20 that extends from the collar flange orthogonally beyond the abutment flange 12 to engage the abutment flange to permit one hundred eighty degree rotative motion of the mounting tube 13 relative to the support post 11.

The fishing rod tube 21 includes a spring leg 22 fixedly mounted to the fishing rod tube adjacent the bifurcated support 16, wherein the spring leg 22 extends laterally of the mounting tube 13 to secure a retraction spring 24 between the collar flange 19 and the spring leg 22. Further it should be noted that the spring leg 22 includes a plurality of spaced spring leg apertures 23 directed through the spring leg 22 at spaced intervals to permit various degrees of tensioning of the fishing rod tube 21 in the retracted orientation, such as indicated in FIG. 1.

A position plate 25 fixedly mounted to the mounting tube 13 extends from the mounting tube at a diametrically opposed orientation relative to the spring leg 22. The position plate 25 includes a U-shaped spring bracket 26 mounted to the position plate 25, with the spring bracket having a bracket base plate 27 that includes a plurality of slots 28 directed therethrough, wherein a fastener 29 directed through one of the slots 28 permits sliding adjustment of the base plate 27 relative to the position plate 25, in a manner as indicated in FIG. 4. Respective first and second bracket plates 30 and 31 are fixedly and orthogonally mounted to opposed ends of the base plate 27, each receiving a lock rod 32 slidably therethrough. The lock rod includes a lock rod handle 33 positioned adjacent the second bracket plate 31, wherein a rod engaging forward end 34 of the lock rod is arranged to project through the first bracket plate 30. A rod plate 35 fixedly mounted to the lock rod 32 intermediate the first and second bracket plates 30 and 31 mounts a rod spring 36 fixedly to the rod plate 35 and to the second bracket plate 31 to retract the rod engaging forward end 34 from the first bracket plate 30 towards the second bracket plate 31. An engagement flange 37 fixedly mounted to the fishing rod tube 21 adjacent the fishing rod free end (see FIG. 5) includes a flange bore 38 arranged to receive the rod engaging forward end 34 therethrough. To effect such reception through the flange bore 38, the lock rod 32 is directed forwardly against the action of the rod spring 36. It should be understood that when a fishing rod is mounted within the fishing rod tube 21, the rod engaging forward end 34 and its frictional engagement within the flange bore 38 is dislodged and by action of the rod spring 36 is withdrawn from the engagement flange 37 to permit the retraction spring 24 to displace the fishing rod to the first position, as illustrated in FIG. 1, from the second position, as illustrated indicated in phantom in FIG. 1.

Arcuate clamp leg 39 is mounted within the fishing rod tube 21, having an externally threaded rod 40 directed through the fishing rod tube, whereupon rotation of the externally threaded rod 40, the arcuate clamp plate 39 rotatably receiving the externally threaded rod 40 is directed to secure the fishing rod within the fishing rod tube 21.

Figure 7:
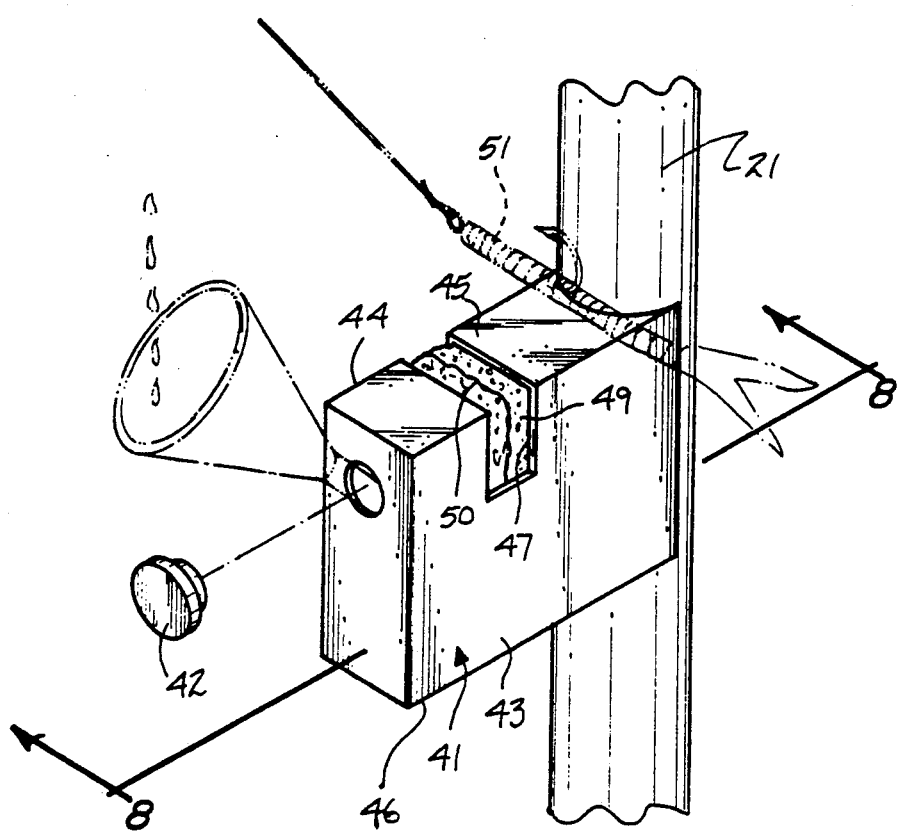
FIG. 7 is an isometric illustration of an optional fish reservoir housing employed by the invention.
Figure 8:
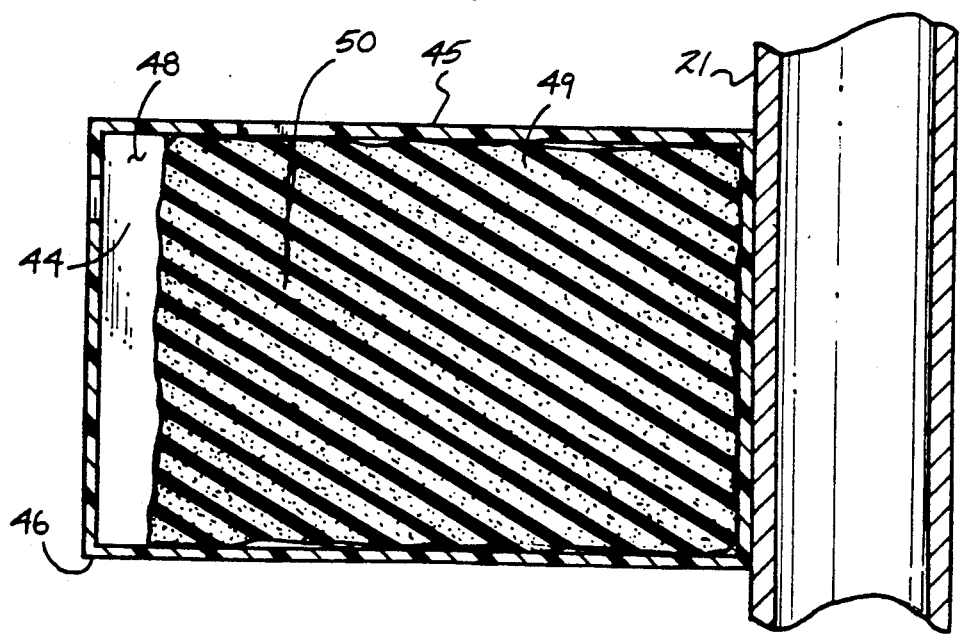
FIG. 8 is an orthographic view, taken along the lines 8—8 of FIG. 7 in the direction indicated by the arrows.

The FIGS. 7 and 8 indicates the use of a reservoir housing 41 having a fill plug 42 through a forward wall of the reservoir housing. The housing includes housing first and second side walls 43 and 44, as well as a housing top wall 45 spaced from a housing floor 46. A U-shaped slot 47 is directed through the first and second walls 43 and 44, as well as the top wall 45 spaced from the floor 46. A housing cavity 48 within the reservoir housing 41 includes a sponge 49 therewithin, the sponge includes a sponge slot 50 coextensive and positioned within the U-shaped slot 47, whereupon a fish lure 51 directed through the sponge slot 50 receives a coating of a liquid fish attractant of any commercially available type that is positioned within the reservoir housing cavity 48 through the fill plug 42 and absorbed by the sponge 49.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fish hooking apparatus, comprising,
   a support post, the support post having a support post lowermost end and a support post uppermost end, and an abutment flange fixedly and orthogonally mounted to the support post between the uppermost end and the lowermost end, and
   a mounting tube, having a mounting tube first end and a mounting tube second end, with the mounting tube receiving the support post through the mounting tube first end, with the mounting tube engaging the abutment flange at the mounting tube first end, and a bifurcated support secured to the mounting tube second end, having a fishing rod tube pivotally mounted within the bifurcated support, and the fishing rod tube has secured thereto spring means arranged for pivoting the fishing rod tube from a first position coaxially aligned at an oblique angle relative to the mounting tube, and the spring means includes a spring leg fixedly mounted to the fishing rod tube at the bifurcated support, and an anchor collar mounted to the mounting tube adjacent the mounting tube first end, and further including a retraction spring extending from the spring leg to the anchor collar, and wherein the spring means further includes a position plate fixedly mounted to the mounting tube at the mounting tube second end extending from the mounting tube on an opposed side relative to the spring leg, with the position plate including latch means for positioning the fishing rod tube in the second position, and the latch means includes a U-shaped spring bracket having a base plate adjustably mounted along the position plate, and the spring bracket including a first bracket plate spaced from a second bracket plate, and the first bracket plate and the second bracket plate arranged in a parallel relationship relative to one another, and a lock rod slidably received through the first bracket plate and the second bracket plate, with the lock rod including a lock rod handle positioned exteriorly of the U-shaped spring bracket, and a rod engaging forward end directed through the first bracket plate, with the lock rod having a lock rod plate positioned intermediate the first bracket plate and the second bracket plate, and a rod spring wound about the lock rod and fixedly secured to the rod plate at a spring first end, and the spring second end secured to the second bracket plate to bias the lock rod and bias the rod engaging forward end between the first bracket plate and the second bracket plate, and wherein the fishing rod tube includes an engagement flange fixedly mounted to the fishing rod tube spaced from the bifurcated support, and the engagement flange includes a flange bore arranged to receive the rod engaging forward end when the fishing rod tube is in the second position permitting displacement of the rod engaging forward end from the flange bore upon a fish strike to the first position.

2. An apparatus as set forth in claim 1 wherein the anchor collar includes a collar flange, and the collar flange includes an abutment leg extending from the collar flange, with the collar flange positioned above the abutment flange, and wherein the abutment leg extends below the abutment flange permitting one hundred eighty degree rotative displacement of the mounting tube about the support post.

3. An apparatus as set forth in claim 2 further including an arcuate clamp plate mounted within the mounting tube adjacent the engagement flange, and an externally threaded rod rotatably secured to the clamp plate threadedly directed through the mounting tube permitting displacement of the arcuate clamp plate within the mounting tube upon rotative displacement of the externally threaded rod within the mounting tube.

4. An apparatus as set forth in claim 3 including a reservoir housing secured to the mounting tube intermediate the mounting tube first end and the mounting tube second end, with the reservoir housing including a housing first side wall spaced from a housing second side wall, and a housing top wall spaced from a housing floor, and the U-shaped slot directed through the housing first side wall and the housing second side wall and the housing top wall, with the U-shaped slot spaced from the housing floor, the reservoir housing further including a housing cavity, with a sponge positioned within the housing cavity, and the sponge having a sponge slot coextensive with the U-shaped slot, and the sponge slot arranged to receive a fish lure therethrough permitting coating of the fish lure with a fluid fish attractant positioned within the housing cavity.

* * * * *